United States Patent Office 3,631,051
Patented Dec. 28, 1971

3,631,051
PROCESS FOR PRODUCING 2-SUBSTITUTED
6,7-BENZOMORPHAN DERIVATIVES
Toshio Atsumi, Kenji Kobayashi, and Yoshiaki Takebayashi, Takarazuka, and Hisao Yamamoto, Nishinomiya, Japan, assignors to Sumitomo Chemical Co., Ltd.
No Drawing. Filed May 28, 1969, Ser. No. 828,738
Claims priority, application Japan, May 30, 1968,
43/37,308; May 31, 1968, 43/37,439, 43/37,440;
Sept. 16, 1968, 43/67,081; Oct. 2, 1968, 43/72,079,
43/72,080, 43/72,081, 43/72,082
Int. Cl. C07d 39/00
U.S. Cl. 260—293.54      8 Claims

ABSTRACT OF THE DISCLOSURE

A process for preparing 2-substituted 6,7-benzomorphan derivatives, and salts thereof, represented by the general formula,

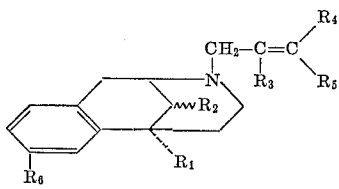

wherein $R_1$ and $R_2$ are respectively $C_1$–$C_3$ alkyl groups; $R_3$ $R_4$ and $R_5$ are respectively hydrogen atoms or $C_1$–$C_3$ alkyl groups; $R_6$ is a hydrogen atom, a hydroxyl group, a $C_1$–$C_3$ alkyl group or a $C_1$–$C_3$ alkoxy group, which process comprises contacting with a mixture of phosphoric acid and phosphorus pentoxide, the ratio of phosphorus pentoxide to phosphoric acid being 0.2 to 2.0 on the base of weight, a 1-substituted 1,2,5,6-tetrahydropyridine derivative, or a salt thereof, represented by the general formula,

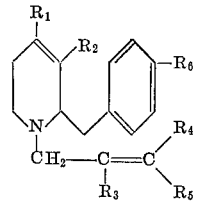

wherein $R_1$, $R_2$, $R_3$, $R_4$, $R_5$, and $R_6$ are as defined above, the cyclisation reaction being conducted in an anhydrous state. The benzomorphan derivatives are useful as analgesics.

This invention relates to a novel process for producing 2-substituted 6,7-benzomorphan derivatives. More particularly, the invention pertains to a novel process for preparing 2-substituted 6,7-benzomorphan derivatives, and salts thereof, represented by the general formula:

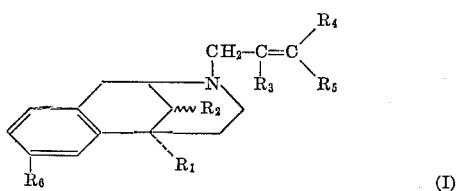

wherein $R_1$ and $R_2$ are respectively $C_1$–$C_3$ alkyl groups; $R_3$, $R_4$ and $R_5$ are respectively hydrogen atoms or $C_1$–$C_3$ alkyl groups; $R_6$ is a hydrogen atom, a hydroxyl group, a $C_1$–$C_3$ alkyl group or a $C_1$–$C_3$ alkoxy group.

According to the present invention, the 2-substituted 6,7-benzomorphan derivative (I) can be prepared by treating with a suitable cyclizing agent a 1-substituted 1,2,5,6-tetrahydropyridine derivative, or a salt thereof, represented by the general formula:

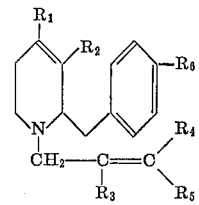

wherein $R_1$, $R_2$, $R_3$, $R_4$, $R_5$ and $R_6$ are as defined above in the Formula I.

The 2-substituted 6,7-benzomorphan derivatives represented by the Formula I have prominent effects as analgesic and pain-relieving activity without or with the minimum non-addiction which property is of great importance for medicines.

A few processes for producing these 6,7-benzomorphan derivatives have heretofore been described. For instance, it is known to obtain the 2-substituted 6,7-benzomorphan derivatives by synthesizing 2-methyl-6,7-benzomorphan derivative, demethylating the compound with cyanogen bromide, and alkenylating the obtained 2-unsubstituted 6,7-benzomorphan derivative with an alkenyl halide or acylating the said 2-unsubstituted 6,7-benzomorphan derivative with an acyl halide and then reducing the obtained 2-acylated 6,7-benzomorphan derivative with LiAlH$_4$ to give 2-substituted 6,7-benzomorphan (E. L. May, Journal of Organic Chemistry, 24, 1435, (1959)).

Contrary to these procedures, we have found, unexpectedly, that a 2-substituted 6,7-benzomorphan derivative of the Formula I can be smoothly and economically prepared in high yield and of high purity by reacting a 1-substituted 1,2,5,6-tetrahydropyridine derivative of the Formula II, or a salt thereof, with an appropriate cyclizing agent.

Concerning such compound as represented by the Formula II which has an unsaturated substituent in 1-position of the pyridine ring, this process could not have been expected to be successful for preparing an appropriate benzomorphan derivative because of reactivity of the unsaturated substituent (S. Archer and L. S. Harris, "Forschritte der Arzneimittelforschung," Birkhäuser Verlag, Basel, 1963, vol. 5, p. 272), but according to our investigation, 2-substituted 6,7-benzomorphan derivative can be directly prepared from a corresponding pyridine derivative which has an unsaturated substituent in 1-position thereof. This new and useful process thus differs markedly from the known methods and represents an improvement thereover.

The 1-substituted 1,2,5,6-tetrahydropyridine derivatives of the Formula II are novel compounds. They are easily prepared by reducing novel 1-substituted 1,2-dihydropyridine derivatives of the formula:

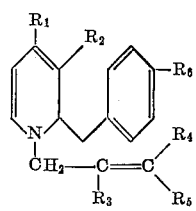

wherein $R_1$, $R_2$, $R_3$, $R_4$, $R_5$ and $R_6$ are as defined above.

The novel 1,2-dihydropyridine derivatives of the Formula III can be prepared by reacting a pyradinium derivative of the formula:

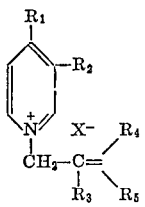
(IV)

wherein X is a halogen atom, R₁, R₂, R₃, R₄ and R₅ are as defined above, with a Grignard reagent represented by the formula:

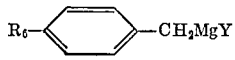
(V)

wherein Y is a halogen atom and R₆ is as defined above. Further, the compounds of the Formula IV are also novel compounds, which are prepared by reacting corresponding pyridine derivatives of the formula:

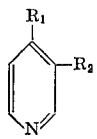
(VI)

wherein R₁ and R₂ are as defined above, with an alkenyl halide derivative of the formula:

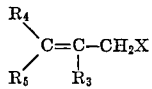
(VII)

wherein X, R₃, R₄ and R₅ have the same significances as mentioned before.

In accordance with the present invention, the method for producing the 2-substituted 6,7-benzomorphan derivatives of the Formula I may be represented, in general, by the following reaction schema:

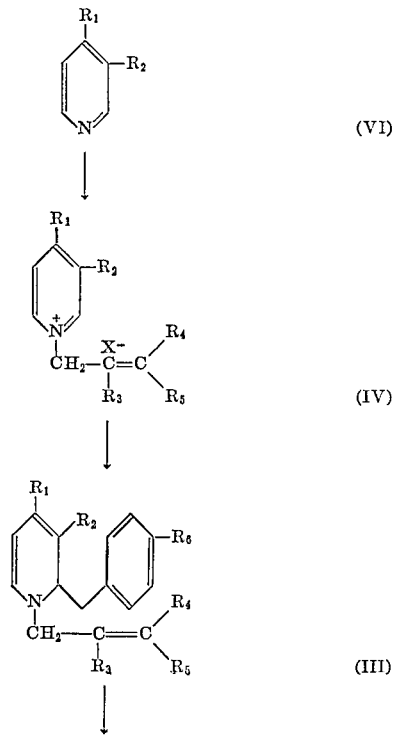

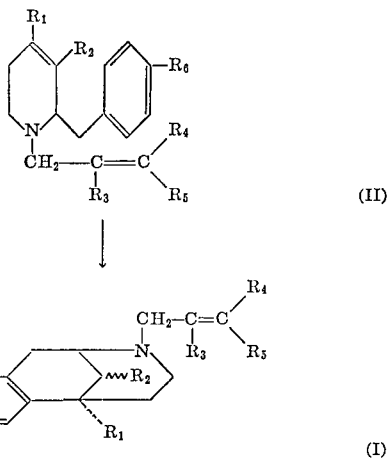

An object of the present invention is to provide a novel process for preparing 2-substituted 6,7-benzomorphan derivatives of high purity, and salts thereof, in high yield.

Another object is to provide a novel process for preparing salts of 2-substituted 6,7-benzomorphan derivatives of the Formula I.

A further object is to provide a process for preparing novel pyridine derivatives.

Other objects of the invention will become apparent from the description that follows.

In order to achieve the above objects, the present invention provides a process for preparing 2-substituted 6,7-benzomorphan derivatives represented by the Formula I which comprises reacting a 1-substituted 1,2,5,6-tetrahydropyridine derivative represented by the Formula II, or a salt thereof, with a suitable cyclizing agent.

Further, the present invention provides a process for producing salts of 6,7-benzomorphan derivatives of the Formula I which comprises reacting a 1-substituted 1,2,5,6-tetrahydropyridine derivative of the Formula II, or a salt thereof, with a suitable cyclizing agent to yield a 2-substituted 6,7-benzomorphan derivative of the Formula I, and then reacting the said 2-substituted 6,7-benzomorphan derivative with a mineral acid such as hydrochloric, sulfuric, nitric, phosphoric or chromic acid, or with an organic acid such as maleic, fumaric, succinic, formic, tartaric or acetic acid.

The processes of the present invention are carried out through the cyclizing reaction from 1,2,5,6-tetrahydropyridine to a 6,7-benzomorphan ring. In a compound of the Formula II which is substituted by the reactive side chain in 1-position, the cyclizing reaction mentioned above is novel and has not heretofore been described in any literature.

According to this invention, 2-substituted 6,7-benzomorphan derivatives are prepared from 1 - substituted 1,2,5,6 - tetrahydropyridine derivatives represented by the Formula II, or salts thereof, by contacting with a mixture of phosphoric acid and phosphorus pentoxide. When 48% hydrobromic acid, 85% phosphoric acid, phosphoric acid-formic acid, aluminum chloride and aluminum bromide are used as a cyclizing agent in this reaction, the aimed 2-substituted 6,7-benzomorphan derivative can not be given at all or in extremely low yield.

The cyclizing agent used in the process of the present invention is a mixture of phosphoric acid and phosphorus pentoxide, and a ratio (w./w.) of phosphorus pentoxide to phosphoric acid is 0 to 2, preferably 0.2 to 1.5. A range of a temperature in this reaction is normally from 90 to 200° C., preferably from 120 to 150° C. The mixture of phosphoric acid and phosphorus pentoxide is also used as a solvent, so it is necessary to use the mixture of phosphoric acid and phosphorus pentoxide in an amount enough to conduct the reaction in a homogeneous system.

The desired 2-substituted 6,7-benzomorphan derivative can be separated from the reaction mixture in a crude form by extraction with prior neutralization and by evaporation to dryness. When $R_6$ is a hydroxyl group or a lower alkoxy group instead of a hydrogen atom, hydrolysis must be practiced before neutralization, and then the reactant is neutralized and extracted with an appropriate solvent. The product is further purified by means of distillation or recrystallization from a suitable solvent such as ether, ethyl acetate, acetone, methanol, ethanol, water or the like.

The 2-substituted 6,7 - benzomorphan derivative obtained according to the above-mentioned process may also be isolated in the form of an acid addition salt by treatment with an acid, e.g. a mineral acid such as hydrochloric, sulfuric, nitric, phosphoric or chromic acid, or an organic acid such as maleic, fumaric, succinic, formic, tartaric or acetic acid.

According to the process of the present invention, there are produced such 2-substituted 6,7-benzomorphan derivatives and acid addition salts thereof as shown below.

2-allyl-5,9-dimethyl-6,7-benzomorphan,
2-allyl-5-methyl-9-ethyl-6,7-benzomorphan,
2-allyl-5-ethyl-9-methyl-6,7-benzomorphan,
2-allyl-5,9-diethyl-6,7-benzomorphan,
2-allyl-5-propyl-9-methyl-6,7-benzomorphan,
2-allyl-5-propyl-9-ethyl-6,7-benzomorphan,
2'-hydroxy-2-allyl-5,9-dimethyl-6,7-benzomorphan,
2'-hydroxy-2-allyl-5-methyl-9-ethyl-6,7-benzomorphan,
2'-hydroxy-2-allyl-5-ethyl-9-methyl-6,7-benzomorphan,
2'-hydroxy-2-allyl-5,9-diethyl-6,7-benzomorphan,
2'-hydroxy-2-allyl-5-propyl-9-methyl-6,7-benzomorphan,
2'-hydroxy-2-allyl-5-propyl-9-ethyl-6,7-benzomorphan,
2-crotyl-5,9-dimethyl-6,7-benzomorphan,
2-crotyl-5-methyl-9-ethyl-6,7-benzomorphan,
2-crotyl-5-ethyl-9-methyl-6,7-benzomorphan,
2-crotyl-5,9-diethyl-6,7-benzomorphan,
2-crotyl-5-propyl-9-methyl-6,7-benzomorphan,
2-crotyl-5-propyl-9-ethyl-6,7-benzomorphan,
2'-hydroxy-2-crotyl-5,9-dimethyl-6,7-benzomorphan,
2'-hydroxy-2-crotyl-5-methyl-9-ethyl-6,7-benzomorphan,
2'-hydroxy-2-crotyl-5-ethyl-9-methyl-6,7-benzomorphan,
2'-hydroxy-2-crotyl-5,9-diethyl-6,7-benzomorphan,
2'-hydroxy-2-crotyl-5-propyl-9-methyl-6,7-benzomorphan,
2'-hydroxy-2-crotyl-5-propyl-9-ethyl-6,7-benzomorphan.

In the next place, the process for preparing the 1-substituted 1,2,5,6-tetrahydropyridin compounds of the Formula II is explained below.

The compounds described before are prepared from appropriate pyridine derivatives of starting materials as shown in the aforesaid reaction scheme.

The procedure comprises the steps of subjecting the pyridine derivatives of the Formula VI to quaternization with an alkenyl halide derivatives of the Formula VII to give pyridinium derivatives of the Formula IV, reacting said pyridinium derivatives with a Grignard reagent of the Formula V, and then reducing the resulting 1-substituted 1,2-dihydropyridine derivatives of the Formula III.

According to the above process, the pyridine derivatives of the Formula VI can be coverted in high yields into corresponding pyridinium derivatives of the Formula IV.

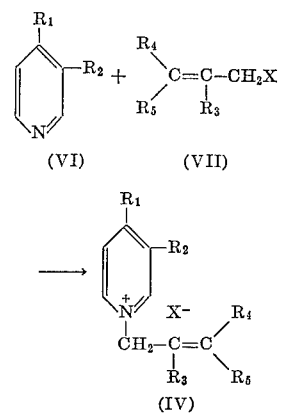

In practicing the above process, the pyridine derivative of the Formula VI is quaternized by the alkenyl halide derivative of the Formula VII in a suitable organic solvent, to form the pyridinium derivative of the Formula IV. Preferable as the solvent are, for example, benzene, toluene, xylene, ether, tetrahydrofuran, dioxane, acetone, ethyl acetate, n-hexane, cyclohexane, chloroform and alcohol. As the alkenyl halide derivatives of the Formula VII, there are used, for example, allyl halide, crotyl halide, 3,3-dimethylallyl halide and beta-methallyl halide. The halides include chlorides, bromides and iodides.

According to the above process, the following pyridinium derivatives are produced:

1-allyl-3,4-dimethyl-pyridinium bromide,
1-allyl-3-methyl-4-ethyl-pyridinium bromide,
1-allyl-3-ethyl-4-methyl-pyridinium bromide,
1-allyl-3,4-diethyl-pyridinium bromide,
1-allyl-3-methyl-4-propyl-pyridinium bromide,
1-allyl-3-ethyl-4-propyl-pyridinium bromide,
1-crotyl-3,4-dimethyl-pyridinium bromide,
1-crotyl-3-methyl-4-ethyl-pyridinium bromide,
1-crotyl-3-ethyl-4-methyl-pyridinium bromide,
1-crotyl-3,4-diethyl-pyridinium bromide,
1-crotyl-3-methyl-4-propyl-pyridinium bromide,
1-crotyl-3-ethyl-4-propyl-pyridinium bromide,
1-(3',3'-dimethylallyl)-3,4-dimethyl-pyridinium bromide,
1-(3',3'-dimethylallyl)-3-methyl-4-ethyl-pyridinium bromide,
1-(3',3'-dimethylallyl)-3-ethyl-4-methyl-pyridinium bromide,
1-(3',3'-dimethylallyl)-3,4-diethyl-pyridinium bromide,
1-(3',3'-dimethylally)-3-methyl-4-propyl-pyridinium bromide,
1-(3',3'-dimethylallyl)-3-ethyl-4-propyl-pyridinium bromide,
1-($\beta$-methallyl)-3,4-dimethyl-pyridinium chloride,
1-($\beta$-methallyl)-3-methyl-4-ethyl-pyridinium chloride,
1-($\beta$-methallyl)-3-ethyl-4-methyl-pyridinium chloride,
1-($\beta$-methallyl)-3,4-diethyl-pyridinium chloride,
1-($\beta$-methallyl)-3-methyl-4-propyl-pyridinium chloride,
1-($\beta$-methallyl)-3-ethyl-4-propyl-pyridinium chloride.

The thus-obtained pyridinium derivatives of the Formula IV are reacted with the Grignard reagent of the Formula V, whereby the novel 1-substituted 1,2-dihydropyridine derivatives of the Formula III can be readily obtained.

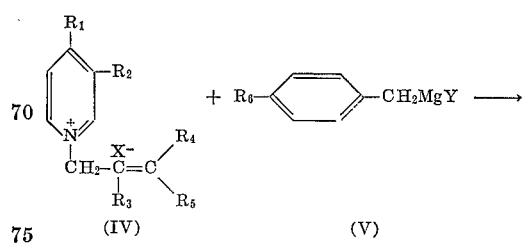

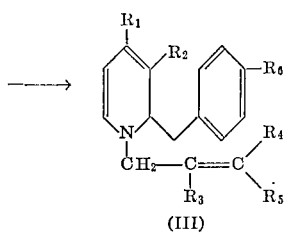

(III)

The above-mentioned process is carried out in a suitable anhydrous solvent, for example, anhydrous ether such as anhydrous ethyl ether and anhydrous tetrahydrofuran. The Grignard reagent of the Formula V is easily obtained by reacting magnesium metal with a benzyl halide derivative in ether.

In accordance with the above process, there are obtained, for example, the following new 1-substituted 1,2-dihydropyridine derivatives.

1-allyl-2-benzyl-3,4-dimethyl-1,2-dihydropyridine,
1-allyl-2-benzyl-3-methyl-4-ethyl-1,2-dihydropyridine,
1-allyl-2-benzyl-3-ethyl-4-methyl-1,2-dihydropyridine,
1-allyl-2-benzyl-3,4-diethyl-1,2-dihydropyridine,
1-allyl-2-benzyl-3-methyl-4-propyl-1,2-dihydropyridine,
1-allyl-2-benzyl-3-ethyl-4-propyl-1,2-dihydropyridine,
1-allyl-2-(p-methoxybenzyl)-3,4-dimethyl-1,2-dihydropyridine,
1-allyl-2-(p-methoxybenzyl)-3-methyl-4-ethyl-1,2-dihydropyridine,
1-allyl-2-(p-methoxybenzyl)-3-ethyl-4-methyl-1,2-dihydropyridine,
1-allyl-2-(p-methoxybenzyl)-3,4-diethyl-1,2-dihydropyridine,
1-allyl-2-(p-methoxybenzyl)-3-methyl-4-propyl-1,2-dihydropyridine,
1-allyl-2-(p-methoxybenzyl)-3-ethyl-4-propyl-1,2-dihydropyridine,
1-crotyl-2-benzyl-3,4-dimethyl-1,2-dihydropyridine,
1-crotyl-2-benzyl-3-methyl-4-ethyl-1,2-dihydropyridine,
1-crotyl-2-benzyl-3-ethyl-4-methyl-1,2-dihydropyridine,
1-crotyl-2-benzyl-3,4-diethyl-1,2-dihydropyridine,
1-crotyl-2-benzyl-3-methyl-4-propyl-1,2-dihydropyridine,
1-crotyl-2-benzyl-3-ethyl-4-propyl-1,2-dihydropyridine,
1-crotyl-2-(p-methoxybenzyl)-3,4-dimethyl-1,2-dihydropyridine,
1-crotyl-2-(p-methoxybenzyl)-3-methyl-4-ethyl-1,2-dihydropyridine,
1-crotyl-2-(p-methoxybenzyl)-3-ethyl-4-methyl-1,2-dihydropyridine,
1-crotyl-2-(p-methoxybenzyl)-3,4-diethyl-1,2-dihydropyridine,
1-crotyl-2-(p-methoxybenzyl)-3-methyl-4-propyl-1,2-dihydropyridine,
1-crotyl-2-(p-methoxybenzyl)-3-ethyl-4-propyl-1,2-dihydropyridine,
1-(3',3'-dimethylallyl)-2-benzyl-3,4-dimethyl-1,2-dihydropyridine,
1-(3',3'-dimethylallyl)-2-benzyl-3-methyl-4-ethyl-1,2-dihydropyridine,
1-(3',3'-dimethylallyl)-2-benzyl-3-ethyl-4-methyl-1,2-dihydropyridine,
1-(3',3'-dimethylallyl)-2-benzyl-3,4-diethyl-1,2-dihydropyridine,
1-(3',3'-dimethylallyl)-2-benzyl-3-methyl-4-propyl-1,2-dihydropyridine,
1-(3',3'-dimethylallyl)-2-benzyl-3-ethyl-4-propyl-1,2-dihydropyridine,
1-(3',3'-dimethylallyl)-2-(p-methoxybenzyl)-3,4-dimethyl-1,2-dihydropyridine,
1-(3',3'-dimethylallyl)-2-(p-methoxybenzyl)-3-methyl-4-ethyl-1,2-dihydropyridine,
1-(3',3'-dimethylallyl)-2-(p-methoxybenzyl)-3-ethyl-4-methyl-1,2-dihydropyridine,
1-(3',3'-dimethylallyl)-2-(p-methoxybenzyl)-3,4-diethyl-1,2-dihydropyridine,
1-(3',3'-dimethylallyl)-2-(p-methoxybenzyl)-3-methyl-4-propyl-1,2-dihydropyridine,
1-(3',3'-dimethylallyl)-2-(p-methoxybenzyl)-3-ethyl-4-propyl-1,2-dihydropyridine,
1-(β-methallyl)-2-benzyl-3,4-dimethyl-1,2-dihydropyridine,
1-(β-methallyl)-2-benzyl-3-methyl-4-ethyl-1,2-dihydropyridine,
1-(β-methallyl)-2-benzyl-3-ethyl-4-methyl-1,2-dihydropyridine,
1-(β-methallyl)-2-benzyl-3,4-diethyl-1,2-dihydropyridine,
1-(β-methallyl)-2-benzyl-3-methyl-4-propyl-1,2-dihydropyridine,
1-(β-methallyl)-2-benzyl-3-ethyl-4-propyl-1,2-dihydropyridine,
1-(β-methallyl)-2-(p-methoxybenzyl)-3,4-dimethyl-1,2-dihydropyridine,
1-(β-methallyl)-2-(p-methoxybenzyl)-3-methyl-4-ethyl-1,2-dihydropyridine,
1-β-methallyl)-2-(p-methoxybenzyl)-3-ethyl-4-methyl-1,2-dihydropyridine,
1-(β-methallyl)-2-(p-methoxybenzyl)-3,4-diethyl-1,2-dihydropyridine,
1-(β-methallyl)-2-(p-methoxybenzyl)-3-methyl-4-propyl-1,2-dihydropyridine,
1-(β-methallyl)-2-(p-methoxybenzyl)-3-ethyl-4-propyl-1,2-dihydropyridine.

When the thus obtained 1-substituted 1,2-dihydropyridine derivatives of the Formula III are reduced, the 1-substituted 1,2,5,6-tetrahydropyridine derivatives represented by the Formula II can be easily produced.

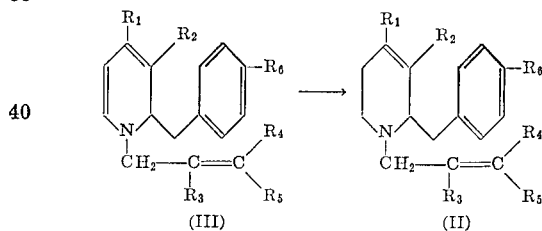

For the production of the compounds represented by the Formula II, the 1-substituted 1,2-dihydropyridine derivatives of the Formula III are ordinarily subjected to a process for the reduction of dihydropyridine to tetrahydropyridine. That is, the reduction of the said dihydropyridine derivatives is carried out according to, for example, reduction with tin and hydrochloric acid, reduction using boron hydride complexes which include sodium borohydride and potassium borohydride or catalytic reduction using palladium-barium sulfate catalysts and Adams's catalysts. Particularly, the reduction using a boron hydride complex in alkaline alcohol with heating, and the catalytic reduction using palladium-barium sulfate in acidic solution are preferable.

According to the above process, it is possible to prepare, for example, the following N-substituted tetrahydropyridine derivatives:

1-allyl-2-benzyl-3,4-dimethyl-1,2,5,6-tetrahydropyridine,
1-allyl-2-benzyl-3-methyl-4-ethyl-1,2,5,6-tetrahydropyridine,
1-allyl-2-benzyl-3-ethyl-4-methyl-1,2,5,6-tetrahydropyridine,
1-allyl-2-benzyl-3,4-diethyl-1,2,5,6-tetrahydropyridine,
1-allyl-2-benzyl-3-methyl-4-propyl-1,2,5,6-tetrahydropyridine,
1-allyl-2-benzyl-3-ethyl-4-propyl-1,2,5,6-tetrahydropyridine,
1-allyl-2-(p-methoxybenzyl)-3,4-dimethyl-1,2,5,6-tetrahydropyridine, 1-allyl-2-(p-methoxybenzyl)-3-methyl-4-ethyl-
1,2,5,6-tetrahydropyridine,
1-allyl-2-(p-methoxybenzyl)-3-ethyl-4-methyl-
1,2,5,6-tetrahydropyridine,
1-allyl-2-(p-methoxybenzyl)-3,4-diethyl1,2,5,6-
tetrahydropyridine,
1-allyl-2-(p-methoxybenzyl)-3-methyl-4-propyl-
1,2,5,6-tetrahydropyridine,
1-allyl-2-(p-methoxybenzyl)-3-ethyl-4-propyl-
1,2,5,6-tetrahydropyridine,
1-crotyl-2-benzyl-3,4-dimethyl-1,2,5,6-tetrahydropyridine,
1-crotyl-2-benzyl-3-methyl-4-ethyl-1,2,5,6-
tetrahydropyridine,
1-crotyl-2-benzyl-3-ethyl-4-methyl-1,2,5,6-
tetrahydropyridine,
1-crotyl-2-benzyl-3,4-diethyl-1,2,5,6-tetrahydropyridine,
1-crotyl-2-benzyl-3-methyl-4-propyl-1,2,5,6-
tetrahydropyridine,
1-crotyl-2-benzyl-3-ethyl-4-propyl-1,2,5,6-
tetrahydropyridine,
1-crotyl-2-(p-methoxybenzyl)-3,4-dimethyl-1,2,5,6-
tetrahydropyridine,
1-crotyl-2-(p-methoxybenzyl)-3-methyl-4-ethyl-1,2,5,6-
tetrahydropyridine,
1-crotyl-2-(p-methoxybenzyl)-3-ethyl-4-methyl-1,2,5,6-
tetrahydropyridine,
1-crotyl-2-(p-methoxylbenzyl)-3,4-diethyl-1,2,5,6-
tetrahydropyridine,
1-crotyl-2-(p-methoxybenzyl)-3-methyl-4-propyl-
1,2,5,6-tetrahydropyridine,
1-crotyl-2-(p-methoxybenzyl)-3-ethyl-4-propyl-1,2,5,6-
tetrahydropyridine,
1-(3',3'-dimethylallyl)-2-benzyl-3,4-dimethyl-
1,2,5,6-tetrahydropyridine,
1-(3',3'-dimethylallyl)-2-benzyl-3-methyl-4-ethyl-
1,2,5,6-tetrahydropyridine,
1-(3',3'-dimethylallyl)-2-benzyl-3-ethyl-4-methyl-
1,2,5,6-tetrahydropyridine,
1-(3',3'-dimethylallyl)-2-benzyl-3,4-diethyl-1,2,5,6-
tetrahydropyridine,
1-(3',3'-dimethylallyl)-2-benzyl-3-methyl-4-propyl-
1,2,5,6-tetrahydropyridine,
1-(3',3'-dimethylallyl)-2-benzyl-3-ethyl-4-propyl-
1,2,5,6-tetrahydropyridine,
1-(3',3'-dimethylallyl)-2-(p-methoxybenzyl)-3,4-
dimethyl-1,2,5,6-tetrahydropyridine,
1-(3',3'-dimethylallyl)-2-(p-methoxybenzyl)-3-
methyl-4-ethyl-1,2,5,6-tetrahydropyridine,
1-(3',3'-dimethylallyl)-2-(p-methoxybenzyl)-3-ethyl-
4-methyl-1,2,5,6-tetrahydropyridine,
1-(3',3'-dimethylallyl)-2-(p-methoxybenzyl)-3,4-
diethyl-1,2,5,6-tetrahydropyridine,
1-(3',3'-dimethylallyl)-2-(p-methoxybenzyl)-3-methyl-
4-propyl-1,2,5,6-tetrahydropyridine,
1-(3',3'-dimethylallyl)-2-(p-methoxybenzyl)-3-ethyl-
4-propyl-1,2,5,6-tetrahydropyridine,
1-(β-methallyl)-2-benzyl-3,4-dimethyl-1,2,5,6-
tetrahydropyridine,
1-(β-methallyl)-2-benzyl-3-methyl-4-ethyl-1,2,5,6-
tetrahydropyridine,
1-(β-methallyl)-2-benzyl-3-ethyl-4-methyl-1,2,5,6-
tetrahydropyridine,
1-(β-methallyl)-2-benzyl-3,4-diethyl-1,2,5,6-
tetrahydropyridine,
1-(β-methallyl)-2-benzyl-3-methyl-4-propyl-1,2,5,6-
tetrahydropyridine,
1-(β-methallyl)-2-benzyl-3-ethyl-4-propyl-1,2,5,6-
tetrahydropyridine,
1-(β-methallyl)-2-(p-methoxybenzyl)-3,4-dimethyl-
1,2,5,6-tetrahydropyridine,
1-(β-methallyl)-2-(p-methoxybenzyl)-3-methyl-4-
ethyl-1,2,5,6-tetrahydropyridine,
1-(β-methallyl)-2-(p-methoxybenzyl)-3-ethyl-4-
methyl-1,2,5,6-tetrahydropyridine,
1-(β-methallyl)-2-(p-methoxybenzyl)-3,4-diethyl
1,2,5,6-tetrahydropyridine,
1-(β-methallyl)-2-(p-methoxybenzyl)-3-methyl-4-
propyl-1,2,5,6-tetrahydropyridine,
1-(β-methallyl)-2-(p-methoxybenzyl)-3-ethyl-4-propyl-
1,2,5,6-tetrahydropyridine.

The above-mentioned novel compounds of the Formula II can also form salts with such mineral and organic acids as, for example, hydrochloric, sulfuric, nitric, phosphoric, maleic, fumaric, succinic, formic, tartaric and acetic acid.

The thus obtained tetrahydropyridine derivatives of the Formula II, or salts thereof, are cyclized according to the procedures described above, whereby they can be readily converted to 2-substituted 6,7-benzomorphan derivatives of the Formula I which are the desired products of the present process.

This invention is further disclosed in the following examples of preferred embodiments thereof, which are presented for purposes of illustration and are not intended to limit the scope of the invention.

EXAMPLE 1

While 64 g. of allyl bromide is added dropwise to a mixture of 50 g. of 3,4-lutidine, 80 ml. of benzene and 80 ml. of acetone with stirring, the temperature is maintained below 10° C. on cooling with ice. After completion of the addition, stirring is continued for an additional 2 hours. Thereafter the reaction mixture is allowed to stand in a refrigerator overnight. The crystals produced are collected by filtration, and recrystallized from acetone-methanol to give 64.7 g. of 1-allyl-3,4-dimethyl-pyridinium bromide, which is hygroscopic crystals having a melting point of 80–81° C.

IR $\nu_{max}^{Paraffin}$: 1640 cm.$^{-1}$

Analysis.—Calcd. for $C_{10}H_{14}NBr$ (percent): C, 52.65; H, 6.19; N, 6.14; Br, 35.03. Found (percent): C, 52.28; H, 6.25; N, 5.86; Br, 34.74.

EXAMPLE 2

A solution mixture of 17.6 g. of crotyl bromide, 10 ml. of benzene and 10 ml. of acetone is added dropwise to a mixture of 10.7 g. of 3,4-lutidine, 20 ml. of benzene and 20 ml. of acetone for 10 minutes with stirring on ice-cooling. Stirring is continued for 2 hours at room temperature, and then the mixture is allowed to stand in a refrigerator overnight. The precipitate produced is collected by filtration and dried to yield 22.3 g. of 1-crotyl-3,4-dimethylpyridinium bromide.

The analytical sample is recrystallized from acetone-methanol, M.P. 128–129° C.

IR $\nu_{max}^{Paraffin}$ 1683, 964 cm.$^{-1}$

Analysis.—Calcd. for $C_{11}H_{16}NBr$ (percent): S, 54.56; H, 6.66; N, 5.78; Br, 33.00. Found (percent): C, 54.29; H, 7.18; N, 5.74; Br, 32.75.

EXAMPLE 3

3,3-dimethylallyl bromide (15.0 g.) is added to a mixture of 3,4-lutidine (10.7 g.), benzene (15 ml.) and acetone (15 ml.) under cooling. The resultant mixture is stirred at room temperature for one hour and then left at 0° C. for one hour. The precipitate is collected by filtration, washed with cold benzene and acetone and dried to yield 21.7 g. of 1-(3'3'-dimethylallyl)-3,4-dimethyl-pyridinium bromide. The analytical sample is recrytsallized from acetone and methanol, M.P. 142.5–143.5° C.

IR $\nu_{max}^{Paraffin}$ 1665, 1635 cm.$^{-1}$

Analysis.—Calcd. for $C_{12}H_{18}NBr$ (percent): C, 56.27; H, 7.07; N, 5.47. Found (percent): C, 55.95; H, 7.09; N, 5.16.

EXAMPLE 4

To a suspension of magnesium turnings (2.92 g.) in 60 ml. of anhydrous ether is added dropwise 15.25 g. of benzyl chloride in 60 ml. of dry ether with vigorous stirring. Thereafter stirring is continued for 15 minutes at room temperature. Fine magnesium powder are removed by filtration.

To a suspension of 22.8 g. of 1-allyl-3,4-dimethyl-pyridinium bromide in 100 ml. of dry ether is added the resulting Grignard solution with vigorous stirring. The mixture is stirred at room temperature for 2 hours and then is poured into a mixture of 200 ml. of ice-water, 65 g. of ammonium chloride and 5 ml. of aqueous ammonia with vigorous stirring. The ethereal layer is extracted with 100 ml. of 2 N-hydrochloric acid. The extract is made alkaline with aqueous ammonia and extracted with 150 ml. of ether. The ethereal extract is washed with an aqueous solution saturated with sodium chloride, dried over anhydrous sodium sulfate and then concentrated to 17.8 g. of a dark brown oily substance.

The oil is distilled under reduced pressure to give 1 - allyl - 2 - benzyl - 3,4 - dimethyl - 1,2 - dihydropyridine.

IR $\nu_{max}^{liq.}$: 1650, 1580, 1496, 988, 915, 700 cm.$^{-1}$

EXAMPLE 5

To a suspension of 13.6 g. of magnesium turnings in 150 ml. of dry ether is added dropwise in a solution of 22 g. of p-methoxybenzyl chloride in 130 ml. of dry ether for 3 hours under refluxing with vigorous stirring. Fine magnesium powder are removed by filtration. The filtrate is added dropwise to a suspension of 9.2 g. of 1-allyl-3,4-dimethylpyridinium bromide in 40 ml. of dry ether with stirring.

After stirring for 90 minutes, the mixture is poured into 200 ml. of ice-water which contains 20 g. of ammonium chloride and a small amount of aqueous ammonia, with vigorous stirring. The ethereal layer is extracted with 150 ml. of cold 2 N-hydrochloric acid. The extract is made alkaline with aqueous ammonia and extracted with 150 ml. of ether. The ethereal extract is washed with an aqueous solution saturated with sodium chloride, dried over anhydrous sodium sulfate and concentrated to 9.1 g. of 1-allyl-2-(p-methoxybenzyl)-3,4-dimethyl-1,2-dihydropyridine as a brown oily product.

IR $\nu_{max}^{liq.}$: 1650, 1614, 1583, 1515, 986, 915, 710 cm.$^{-1}$

To a suspension of 1.7 g. of magnesium turnings in 50 ml. of dry ether is added dropwise 8.9 g. of benzyl chloride in 50 ml. of dry ether with vigorous stirring. Thereafter the mixture is stirred for 15 minutes at room temperature. Fine magnesium powders are removed by filtration. The fiiltrate is added dropwise to a suspension of 12.1 g. of 1-crotyl-3,4-dimethyl-pyridinium bromide in 50 ml. of dry ether. After stirring for 2 hours at room temperature, the mixture is poured into 200 ml. of ice water, which is contained 30 g. of ammonium chloride and a small amount of ammonia, with vigorous stirring. The ethereal layer is extracted with 150 ml. of 10% hydrochloric acid. The extract is made alkaline with aqueous ammonia and extracted with 150 ml. of ether. The ethereal extract is washed with an equeous solution saturated with sodium chloride, dried over anhydrous sodium sulfate and concentrated to 6.1 g. of 1-crotyl-2-benzyl-3,4-dimethyl-1,2-dihydropyridine as a yellow oily product.

IR $\nu_{max}^{liq.}$ : 1650, 1580, 1495, 960, 700 cm.$^{-1}$

EXAMPLE 7

To a suspension of magnesium turnings (13.6 g.) in 150 ml. of dry ether is added 22 g. of p-methoxybenzyl chloride in 130 ml. of dry ether for 3 hours under refluxing with vigorous stirring. Resulting fine magnesium powder is removed by filtration. The filtrate is added dropwise to a suspension of 9.7 g. of 1-crotyl-3,4-dimethyl-pyridinium bromide in 40 ml. of dry ether with vigorous stirring.

After stirring at room temperature for 90 minutes, the mixture is poured into 200 ml. of ice-water, which is contained 25 g. of ammonium chloride and a small amount of aqueous ammonia with vigorous stirring. The ethereal layer is extracted with 150 ml. of 10% hydrochloric acid. The extract is made alkaline with aqueous ammonia and extracted with 150 ml. of ether. The ethereal extract is washed with an aqueous solution saturated with sodium chloride, dried over anhydrous sodium sulfate and concentrated to 9.75 g. of a brown oily residue, which is distilled under reduced presssure to give 1-crotyl-2-(p-methoxybenzyl)-3,4-dimethyl-1,2-dihydropyridine.

IR $\nu_{max}^{liq.}$: 1650, 1614, 1580, 1511, 964, 710 cm.$^{-1}$

EXAMPLE 8

To a suspension of 6.0 g. of magnesium turnings is added a solution of 9.65 g. of p-methoxybenzyl chloride in 60 ml. of dry ether over 3 hours under refluxing with vigorous stirring. The resulting fine magnesium powder is removed by filtration. The filtrate is added to a suspension of 12.1 g. of 1-(3′,3′-dimethylallyl)-3,4-dimethyl-pyridinium bromide in 40 ml. of dry ether with vigorous stirring. After stirring for 2 hours, the mixture is poured into about 100 ml. of ice-water contained 5 ml. of aqueous ammonia and 20 g. of ammonium chloride under vigorous stirring.

The ethereal layer is extracted with 40 ml. of 2 N-hydrochloric acid. The extract is made alkaline with aqueous ammonia and extracted with 80 ml. of ether. The ethereal extract is washed with an aqueous solution saturated with sodium chloride, dried over anhydrous sodium sulfate and concentrated to 5.1 g. of a dark brown oily residue, which is distilled under reduced pressure to give 1-(3′,3′-dimethylallyl)-2-(p-methoxybenzyl)-3,4-dimethyl-12-dihydropyridine.

IR $\nu_{max}^{liq.}$: 1648, 1613, 1578, 1510 cm.$^{-1}$

EXAMPLE 9

To a suspension of 1.2 g. of magnesium turnings in 30 ml. of dry ether is added dropwise a solution of 6 g. of benzyl chloride in 30 ml. of dry ether with vigorous stirring. The mixture is stirred at a room temperature for 15 minutes. The filtrate is added to a suspension of 10 g. of 1-(3′,3′-dimethylallyl)-3,4-dimethyl-pyridinium bromide in 50 ml. of dry ether. After stirring at a room temperature for 2 hours, the mixture is poured into 100 ml. of ice-water, which contained 25 g. of ammonium chloride and a small amount of aqueous ammonia, with vigorous stirring. The ethereal layer is extracted with 50 ml. of 10% hydrochloric acid. The extract is made alkaline with aqeuous ammonia and extracted with 100 ml. of ether. The ethereal extract is washed with an aqueous solution saturated with sodium chloride, dried over anhydrous sodium sulfate and concentrated to 6.5 g. of 1-(3′, 3′ - dimethylallyl)-2-benzyl-3,4-dimethyl-1,2-dihydropyridine as a brown oily substance.

IR $\nu_{max}^{liq.}$: 1650, 1580, 1497, 700 cm.$^{-1}$

EXAMPLE 10

To a mixture of 8.1 g. of 1-allyl-2-benzyl-3,4-dimethyl-1,2-dihydropyridine, 30 ml. of methanol and 20 ml. of 1 N-sodium hydroxide is added 1.1 g. of sodium borohydride. After the stirring at 50–60° C. for 2 hours, the mixture is diluted with 100 ml. of ice-water and extracted with 150 ml. of ether. The extract is washed with an aqueous solution saturated with sodium chloride, dried over anhydrous sodium sulfate and concentrated to a yellow oily substance, which is distilled under reduced pressure to give 5.45 g. of 1-allyl-2-benzyl-3,4-dimethyl-1,2,5,6-tetrahydropyridine, B.P. 105–115° C./0.3 mm. Hg.

IR $\nu_{max}^{liq.}$: 1650, 1605, 1495, 990, 910, 724, 700 cm.$^{-1}$

NMR (CDCl$_3$, T.M.S.): 2.8$\tau$ (singlet, ring proton, 5H), 4.1–5.2$\tau$ (multiplet, olefinic proton, 3H), 6.6–7.5$\tau$ (multiplet, methylene group, methine group, 9H), 8.4$\tau$ (singlet, methyl group, 6H).

EXAMPLE 11

To a mixture of 9.1 g. of 1-allyl-2-(p-methoxybenzyl)-3,4-dimethyl-1,2-dihydropyridine, 35 ml. of methanol and 20 ml. of 1 N-sodium hydroxide is added 1.2 g. of sodium borohydride. The reaction mixture is stirred at 50–60° C. for 2 hours, and thereafter the mixture is diluted with 100 ml. of ice-water and extracted with 150 ml. of ether. The extract is washed with an aqueous solution saturated with sodium chloride, dried over anhydrous sodium sulfate and concentrated to a brown oily residue, which is distilled under reduced pressure to give 5.1 g. of 1-allyl-2 - (p - methoxybenzyl)-3,4-dimethyl-1,2,5,6-tetrahydropyridine, B.P. 126–134° C./0.6 mm. Hg.

IR $\nu_{max}^{liq.}$: 1644, 1613, 1585, 1512, 988, 910 cm.$^{-1}$

NMR (CDCl$_3$, T.M.S.): 2.75–3.28τ (multiplet, ring proton, 4H), 4.31–5.15τ (multiplet, olefinic proton, 3H), 6.22τ (singlet, methoxy group, 3H), 6.6–7.5τ (multiplet, methylene group, methine group, 9H), 8.4τ (singlet, methyl group, 6H).

EXAMPLE 12

To a mixture of 6.1 g. of 1-crotyl-2-benzyl-3,4-dimethyl-1,2-dihydropyridine, 30 ml. of methanol and 20 ml. of 1 N-sodium hydroxide is added 1 g. of sodium borohydride. The mixture is stirred at 50–60° C. for 2 hours, and then the mixture is diluted with 100 ml. of ice-water and extracted with 150 ml. of ether. The extract is washed with an aqueous solution saturated with sodium chloride, dried over anhydrous sodium sulfate and concentrated to a yellow oily residue, which is distilled under reduced pressure to give 5.05 g. of 1-crotyl-2-benzyl-3,4-dimethyl-1,2,5,6-tetrahydropyridine, B.P. 112–119° C./0.3 mm. Hg.

IR $\nu_{max}^{liq.}$: 1605, 1500, 965, 700 cm.$^{-1}$

NMR (CDCl$_3$, T.M.S.): 2.8τ (singlet, ring proton, 5H), 4.25–4.75τ (multiplet, olefinic proton, 2H), 8.4τ (multiplet, olefinic methyl, 9H).

EXAMPLE 13

To a solution of 9.7 g. of 1-crotyl-2-(p-methoxybenzyl)-3,4-dimethyl-1,2-dihydropyridine in 40 ml. of methanol are added 25 ml. of 1 N-sodium hydroxide and 1.4 g. of sodium borohydride successively. The resultant mixture is stirred at 55–60° C. for 2 hours, diluted with 100 ml. of ice-water and extracted with 150 ml. of ether. The ethereal extract is washed with a solution saturated with sodium chloride, dried over anhydrous sodium sulfate and concentrate to a yellow oily residue, which is distilled under reduced pressure to give 6.75 g. of 1-crotyl-2-(p-methoxybenzyl)-3,4-dimethyl-1,2,5,6-tetrahydropyridine, B.P. 126–132° C./0.09 mm. Hg.

IR $\nu_{max}^{liq.}$: 1615, 1587, 1513, 962 cm.$^{-1}$

NMR (CDCl$_3$, T.M.S.): 2.76–3.28τ (multiplet, ring proton, 4H), 43–4.7τ (multiplet( olefinic proton, 2H), 6.21τ (singlet, methoxy group, 3H) 8.4τ (multiplet, olefinic methyl, 9H).

EXAMPLE 14

To a mixture of 6.5 g. of 1-(3',3'-dimethylallyl)-2-benzyl-3,4-dimethyl-1,2-dihydropyridine, 40 ml. of methanol and 25 ml. of 1 N-sodium hydroxide is added 1.37 g. of sodium borohydride. The mixture is stirred at 55–60° C. for 2 hours, diluted with 60 ml. of ice-water and extracted with 100 ml. of ether. The extract is washed with an aqueous solution saturated with sodium chloride, dried over anhydrous sodium sulfate and concentrated to a yellow oily residue.

The residue is distilled under reduced pressure to give 4.2 g. of 1-(3',3'-dimethylallyl)-2-benzyl-3,4-dimethyl-1,2,5,6-tetrahydropyridine, B.P. 108–117° C./0.1 mm. Hg.

IR $\nu_{max}^{liq.}$: 1675, 1605, 1497, 725, 697 cm.$^{-1}$

EXAMPLE 15

To a solution of 1-(3',3'-dimethylallyl)-2-(p-methoxybenzyl)-3,4-dimethyl-1,2-dihydropyridine (5.1 g.) in methanol (25 ml.), 1 N-sodium hydroxide (20 ml.) and sodium borohydride (1.0 g.) are added. The resultant mixture is stirred at 50–60° C. for 2 hours, diluted with ice-water and extracted with 60 ml. of ether. The ethereal extract is washed with an aqueous solution saturated with sodium chloride, dried over anhydrous sodium sulfate and concentrated to a yellow oily residue.

The residue is distilled under reduced pressure to give 1-(3',3'-dimethylallyl)-2-(p-methoxybenzyl) - 3,4 - dimethyl-1,2,5,6-tetrahydropyridine (2.5 g.), B.P. 129–135° C./0.16 mm. Hg.

IR $\nu_{max}^{liq.}$: 1675 (weak), 1615, 1585, 1512 cm.$^{-1}$

NMR (CDCl$_3$, T.M.S.): 1.57–1.67 p.p.m. (multiplet, methyl group, 12H), 3.75 p.p.m. (singlet, methoxy group, 3H), 2.3–3.5 p.p.m. (multiplet, methylene group, methine group, 9H, 5.08 p.p.m (multiplet, olefinic proton, 1H), 6.7–7.25 p.p.m. (multiplet, ring proton, 4H).

EXAMPLE 16

Twenty five grams of phosphorus pentoxide is dissolved in 33 g. of 85% phosphoric acid with stirring and heating. To a solution of phosphorus pentoxide and phosphoric acid is added 5.4 g. of 1-allyl-2-benzyl-3,4-dimethyl-1,2,5,6-tetrahydropyridine and the mixture is stirred at 130–135° C. for 20 hours in a stream of nitrogen. The mixture is poured into ice-water with vigorous stirring and then the solution is made alkaline with aqueous ammonia. The alkaline solution is extracted with 150 ml. of ether. The ethereal extract is washed with an aqueous solution saturated with sodium chloride, dried over anhydrous sodium sulfate and concentrated to a yellow oily residue.

The residue is distilled under reduced pressure to give 3.1 g. of 2-allyl-5,9-dimethyl-6,7-benzomorphan, B.P. 107–109° C./0.15 mm. Hg.

IR $\nu_{max}^{liq.}$: 3060, 1645, 1493, 990, 912, 754, 720 cm.$^{-1}$

The free base is then converted into its hydrochloric acid salt by a conventional method, the salt having the empirical formula C$_{17}$H$_{24}$NCl.

*Analysis.*—Calcd. for C$_{17}$H$_{24}$NCl (percent): C, 73.51; H, 8.71; N, 5.04; Cl, 12.75. Found (percent): C, 72.88; H, 8.62; N, 4.93; Cl, 12.91.

EXAMPLE 17

To a solution of 25 g. of phosphorus pentoxide and 33 g. of 85% phosphoric acid is added 4.7 g. of 1-allyl-2-(p-methoxybenzyl)-3,4-dimethyl-1,2,5,6 - tetrahydropyridine with stirring. The mixture is stirred at 130–135° C. for 20 hours in a stream of nitrogen.

After the temperature of the reaction mixture is fallen below 100° C., 30 ml. of 3 N-hydrochloric acid is added thereto. After being refluxed for an hour, the mixture is diluted with ice-water, made alkaline with aqueous ammonia and extracted with 150 ml. of ether. The ethereal extract is washed with an aqueous solution saturated with sodium chloride, dried over anhydrous sodium sulfate and concentrated to a solidal substance, which is crystallized from methanol-water to give 2'-hydroxy-2-allyl-5,9-dimethyl-6,7-benzomorphan, M.P. 141–142° C.

IR $\nu_{max}^{Paraffin}$: 2600 (broad), 1640, 1620, 1582, 990, 915, 800, 760 cm.$^{-1}$

EXAMPLE 18

Phosphorus pentoxide (30 g.) is dissolved in 39 g. of 85% phosphoric acid by heating. 1-crotyl-2-benzyl-3,4-dimethyl-1,2,5,6-tetrahydrpyridine (5 g.) is added to a solution of 30 g. of phosphorus pentoxide in 39 g. of 85% phosphoric acid under stirring. Thereafter, stirring is continued at 130° C. for additional 20 hours in a stream of nitrogen.

The reaction mixture is poured into ice-water and made alkaline with aqueous ammonia. The solution is extracted with 200 ml. of ether. The ethereal extract is washed with an aqueous solution saturated with sodium chloride, dried over anhydrous sodium sulfate and concentrated to a yellow oily residue, which is distilled under reduced pressure to give 1.41 g. of 2-crotyl-5,9-dimethyl-6,7-benzomorphan, B.P. 109–118° C./0.2 mm. Hg.

IR $\nu_{max.}^{liq.}$: 1494, 964, 755, 720 cm.$^{-1}$

NMR (CDCl$_3$, T.M.S.): 2.88–2.96 $\tau$ (multiplet, ring proton, 4H), 4.32–4.53 $\tau$ (multiplet olefinic proton, 2H), 8.29–8.38 $\tau$ (multiplet, olefinic methyl, 3H), 8.65 $\tau$ (singlet, 5-methyl, 3H), 9.2 $\tau$ (doublet, J=7 cps, 9-methyl, 3H).

The free base is converted to the hydrochloride by contacting with gaseous hydrogen chloride. The precipitate is collected by filtration and washed with ether. Recrystallization from acetone gives 2-crotyl-5,9-dimethyl-6,7-benzomorphan hydrochloride, M.P. 212–215° C.

IR $\nu_{max.}^{Paraffin}$: 2450 (broad), 1675, 1608 (weak), 1495, 974 747, 724 cm.$^{-1}$ Analysis.—Calcd. for $C_{18}H_{26}NCl$ (percent): C, 74.07; H, 8.98; N, 4.80; Cl, 12.15. Found (percent): C, 74.36; H, 8.88; N, 4.64; Cl, 12.11.

What is claimed is:

1. A process for preparing 2-substituted 6,7-benzomorphan derivatives, salts thereof, represented by the general formula,

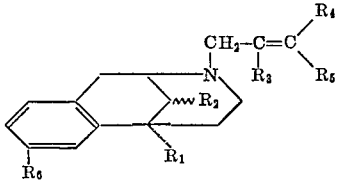

wherein $R_1$ and $R_2$ are respectively $C_1$–$C_3$ alkyl groups; $R_3$, $R_4$ and $R_5$ are respectively hydrogen atoms or $C_1$–$C_3$ alkyl groups; $R_6$ is a hydrogen atom, a hydroxyl group, a $C_1$–$C_3$ alkyl group or a $C_1$–$C_3$ alkoxy group, which process comprises contacting with a mixture of phosphoric acid and phosphorus pentoxide, the ratio of phosphorus pentoxide to phosphoric acid being 0.2 to 2.0 on the base of weight, a 1-substituted 1,2,5,6-tetrahydropyridine derivative, or a salt thereof, represented by the general formula,

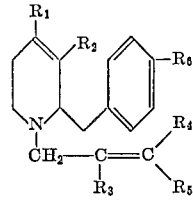

wherein $R_1$, $R_2$, $R_3$, $R_4$, $R_5$ and $R_6$ are as defined above, the cyclisation reaction being conducted in an anhydrous state.

2. A process according to claim 1, wherein the ratio of phosphorus pentoxide to phosphoric acid is 0.2 to 1.5 on the base of the weight.

3. A process according to claim 1, wherein the reaction is carried out at a temperature within a range between 90° C. and 200° C.

4. A process according to laim 1, wherein the mixture of phosphoric acid and phosphorus pentoxide is used in an amount enough to conduct the reaction in a homogeneous system.

5. A process for preparing 2-substituted 6,7-benzomorphan derivatives, and salts thereof, represented by the general formula,

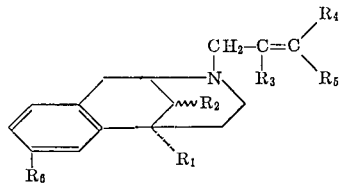

wherein $R_1$ and $R_2$ are respectively $C_1$–$C_2$ alkyl groups; $R_3$, $R_4$ and $R_5$ are respectively hydrogen atoms or $C_1$–$C_3$ alkyl groups; $R_6$ is a hydrogen atom, a hydroxyl group, a $C_1$–$C_3$ alkyl group or a $C_1$–$C_3$ alkoxy group, which process comprises reducing a 1-substituted 1,2-dihydropyridine derivative, or a salt thereof, represented by the general formula,

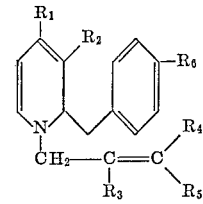

wherein $R_1$, $R_2$, $R_3$, $R_4$, $R_5$ and $R_6$ are as defined above, and then contacting with a mixture of phosphoric acid and phosphorus pentoxide, a ratio of phosphorus pentoxide to phosphoric acid being 0.2 to 2.0 on the base of the weight, the resulting 1-substituted 1,2,5,6-tetrahydropyridine derivative, or a salt thereof, represented by the general formula,

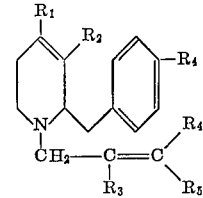

wherein $R_1$, $R_2$, $R_3$, $R_4$, $R_5$ and $R_6$ are as defined above, the cyclisation reaction being conducted in an anhydrous state.

6. A process according to claim 5, wherein the reduction of the 1-substituted 1,2-dihydropyridine derivative is carried out by contacting the 1-substituted 1,2-dihydropyridine derivative with tin and hydrochloric acid, or boron hydride complexes which include sodium borohydride and potassium borohydride or hydrogen in the presence of a palladium-barium sulfate catalysts or Adams's catalysts.

7. A process for preparing 2-substituted 6,7-benzomorphan derivatives, and salts thereof, represented by the general formula,

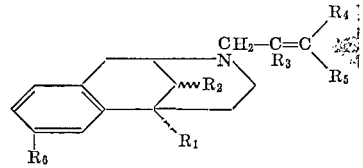

wherein $R_1$ and $R_2$ are respectively $C_1$–$C_3$ alkyl groups; $R_3$, $R_4$ and $R_5$ are respectively hydrogen atoms or $C_1$–$C_3$ alkyl groups; $R_6$ is a hydrogen atom, a hydroxyl group, a $C_1$–$C_3$ alkyl group or a $C_1$–$C_3$ alkoxy group, which process comprises reacting a pyridinium derivative represented by the general formula,

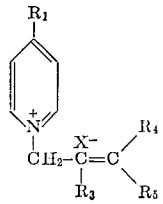

wherein X is a halogen atom, $R_1$, $R_2$, $R_3$, $R_4$ and $R_5$ are as defined above, with a Grignard reagent represented by the general formula,

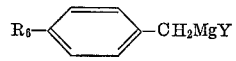

wherein Y is a halogen atom and $R_6$ is as defined above; reducing the resulting 1-substituted 1,2-dihydropyridine derivative represented by the general formula,

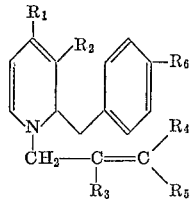

wherein $R_1$, $R_2$, $R_3$, $R_4$, $R_5$ and $R_6$ are as defined above; and then contacting with a mixture of phosphoric acid and phosphorus pentoxide, the ratio of phophorus pentoxide to phosphoric acid being 0.2 to 2.0 on the base of the weight, the resulting 1-substituted 1,2,5,6-tetrahydropyridine derivative, or a salt thereof, represented by the general formula,

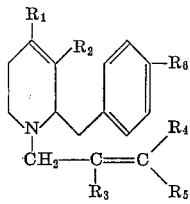

wherein $R_1$, $R_2$, $R_3$, $R_4$, $R_5$ and $R_6$ are as defined above, the cyclisation reaction being carried out in an anhydrous state.

8. A process for preparing 2-substituted 6,7-benzomorphan derivatives, and salts thereof, represented by the general formula,

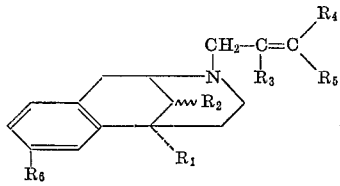

wherein $R_1$ and $R_2$ are respectively $C_1$-$C_3$ alkyl groups; $R_3$, $R_4$ and $R_5$ are respectively hydrogen atoms or $C_1$-$C_3$ alkyl groups; $R_6$ is a hydrogen atom, a hydroxy group, a $C_1$-$C_3$ alkyl group or a $C_1$-$C_3$ alkoxy group, which process comprises reacting a pyridine derivative represented by the general formula,

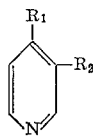

wherein $R_1$ and $R_2$ are as defined above, with an alkenyl halide derivative represented by the general formula,

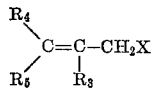

wherein X is a halogen atom, $R_3$, $R_4$ and $R_5$ are as defined above; reacting the resulting pyridinium derivative represented by the general formula,

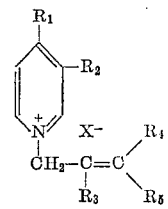

wherein X, $R_1$, $R_2$, $R_3$, $R_4$ and $R_5$ are as defined above, with a Grignard reagent represented by the general formula,

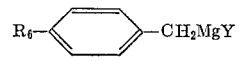

wherein Y is a halogen atom and $R_6$ is as defined above; reducing the resulting 1-substituted 1,2-dihydropyridine derivative, or a salt thereof, represented by the general formula,

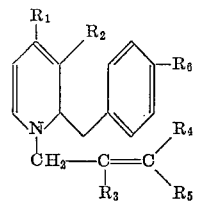

wherein $R_1$, $R_2$, $R_3$, $R_4$, $R_5$ and $R_6$ are as defined above; and then contacting with a mixture of phosphoric acid and phosphorus pentoxide, the ratio of phosphorus pentoxide to phosphoric acid being 0.2 to 2.0 on the base of the weight, the resulting 1-substituted 1,2,5,6-tetrahydropyridine derivative represented by the general formula,

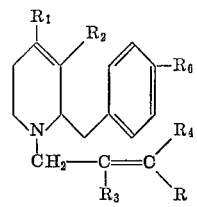

wherein $R_1$, $R_2$, $R_3$, $R_4$, $R_5$ and $R_6$ as as defined above, the cyclisation reaction being carried out in an anhydrous state.

References Cited
UNITED STATES PATENTS 2,075,359  3/1937  Salzberg et al. _____ 424—250
3,417,094  12/1968  Dexter _____ 260—DIG 13

OTHER REFERENCES

J. Org. Chem., vol. 27, pages 245–246, 1962, Ager et al.

HENRY R. JILES, Primary Examiner

S. D. WINTERS, Assistant Examiner

U.S. Cl. X.R.

260—294.7 B, DIG 13, 290 H, 297 R, 290 HL